(12) United States Patent
Sarma

(10) Patent No.: US 7,911,493 B2
(45) Date of Patent: Mar. 22, 2011

(54) DISPLAY ACCESSORY FOR A MOBILE DEVICE

(75) Inventor: Srinivas Garimella Sarma, Carlsbad, CA (US)

(73) Assignee: Kyocera Corporation, Kyoto (JP)

( * ) Notice: Subject to any disclaimer, the term of this patent is extended or adjusted under 35 U.S.C. 154(b) by 1495 days.

(21) Appl. No.: 11/305,284

(22) Filed: Dec. 16, 2005

(65) Prior Publication Data

US 2010/0255877 A1    Oct. 7, 2010

(51) Int. Cl.
*H04N 7/14* (2006.01)
(52) U.S. Cl. ............... 348/14.01; 348/14.02; 348/14.04; 455/557
(58) Field of Classification Search .... 348/14.01–14.16, 348/552; 455/566, 569, 564, 557
See application file for complete search history.

(56) References Cited

U.S. PATENT DOCUMENTS

| 6,781,635 B1* | 8/2004 | Takeda ........................... 348/552 |
| 2002/0094845 A1* | 7/2002 | Inasaka ........................... 455/566 |
| 2006/0259942 A1* | 11/2006 | Toyama et al. ................. 725/133 |

* cited by examiner

*Primary Examiner* — Melur Ramakrishnaiah

(57) ABSTRACT

A portable wireless system that comprises a display accessory in communication with a mobile device. The mobile device is configured to communicate with a base station. The mobile device has a memory component configured to receive and store compressed audio video content. The display accessory comprises a controller module, a local power supply, a display, and an auditory output device. The controller module is configured to communicate with the mobile device and receive the stored audio video content through a connection medium. The local power supply supplies energy to the display accessory. The display depicts video signals received from the controller module and receives power from the local power supply. The auditory output device processes audio signals from the controller module and receives power from the local power supply.

17 Claims, 6 Drawing Sheets

DISPLAY ACCESSORY FOR A MOBILE DEVICE

FIELD OF THE INVENTION

The claimed subject matter pertains generally to an accessory for a mobile device. More particularly, the claimed subject matter provides for the viewing of audio video content on a separate display.

BACKGROUND OF THE INVENTION

Currently mobile devices such as cellular phones, personal digital assistant(s) (PDAs), and like devices are prevalent in society and are progressively gaining more functionality. Originally, mobile devices comprised simple two-way communication devices designed to provide a connective service to the user. These devices evolved into the cellular phones or mobile stations of today. These mobile stations provide users with such features as downloadable ring tones, music, integrated cameras and viewing screens, organizing and day planning software applications, alarm clocks, and calculators.

Regretfully, there is a significant flaw with the mobile station, namely, the mobile station has a display that is too compact to provide a desirable audio video experience. For instance, the end user can view a video, but only within the confines of the miniaturized viewing screen provided on the mobile station An additional shortcoming of the current design of a mobile station is sound quality.

It is well understood in the art that mobile stations are physically compact due to the portable nature of the device. However, this inherent limitation affects the quality of a user's audio visual experience. Thus, there remains a strong need to provide an apparatus to overcome the limitations associated with viewing audio video content on a mobile station without impacting the current design of mobile stations.

SUMMARY OF THE INVENTION

A portable wireless system that comprises a mobile device and a display accessory that is in communication with the mobile device. The mobile device is configured to communicate with a base station. The mobile device has a memory component configured to receive and store compressed audio video content. The display accessory comprises a controller module, a local power supply, a display, and an auditory output device. The controller module is configured to operatively communicate with the mobile device and receive and process the plurality of stored audio video content through a connection medium. The local power supply is configured to supply energy to the display accessory. The display is configured to depict video signals received from the controller module and receives power from the local power supply. The auditory output device is configured to process audio signals from the controller module and receives power from the local power supply.

A method for viewing audio video content on a mobile device with a display accessory, the method comprising acquiring a plurality of compressed audio video content through a wireless network. The method then proceeds to store the plurality of compressed audio video content on the mobile device. The method also interfaces the mobile device to the display accessory through a connection medium. Additionally, the method accesses compressed audio video content on the mobile device through the connection medium. The method then proceeds to transfer the plurality of compressed audio video content through the connection medium from the mobile device to the display accessory. The method also enables a controller to read the compressed audio video content stored on the mobile device, and the controller is configured to process and generate rendered video signals and processed audio signals.

BRIEF DESCRIPTION OF THE DRAWINGS

References to the following drawings are for illustrative purposes, and not for limiting purposes describe one or more illustrative embodiments.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described hereinafter may vary as to configuration, as to details, and as to the functionality of system elements. Additionally, the methods may vary as to details acquiring, interfacing, accessing, and processing without departing from the illustrative method disclosed herein.

The system and method described herein enables improved viewing of audio video content stored on a mobile device 20. An exemplary embodiment of the apparatus is a display accessory 10 with integrated sound that is communicatively coupled with the mobile device 20. The display accessory 10 may be used to view compressed audio video content stored on the mobile device 20 in a user-friendly fashion. The audio video content may comprise personal movies, pictures, sound files, and any combination thereof, captured by the integrated camera and microphone found on most mobile devices today. Additionally, the audio video content may comprise media downloaded from, for example, a movie server 50, or other such audio video server.

Figure 1:
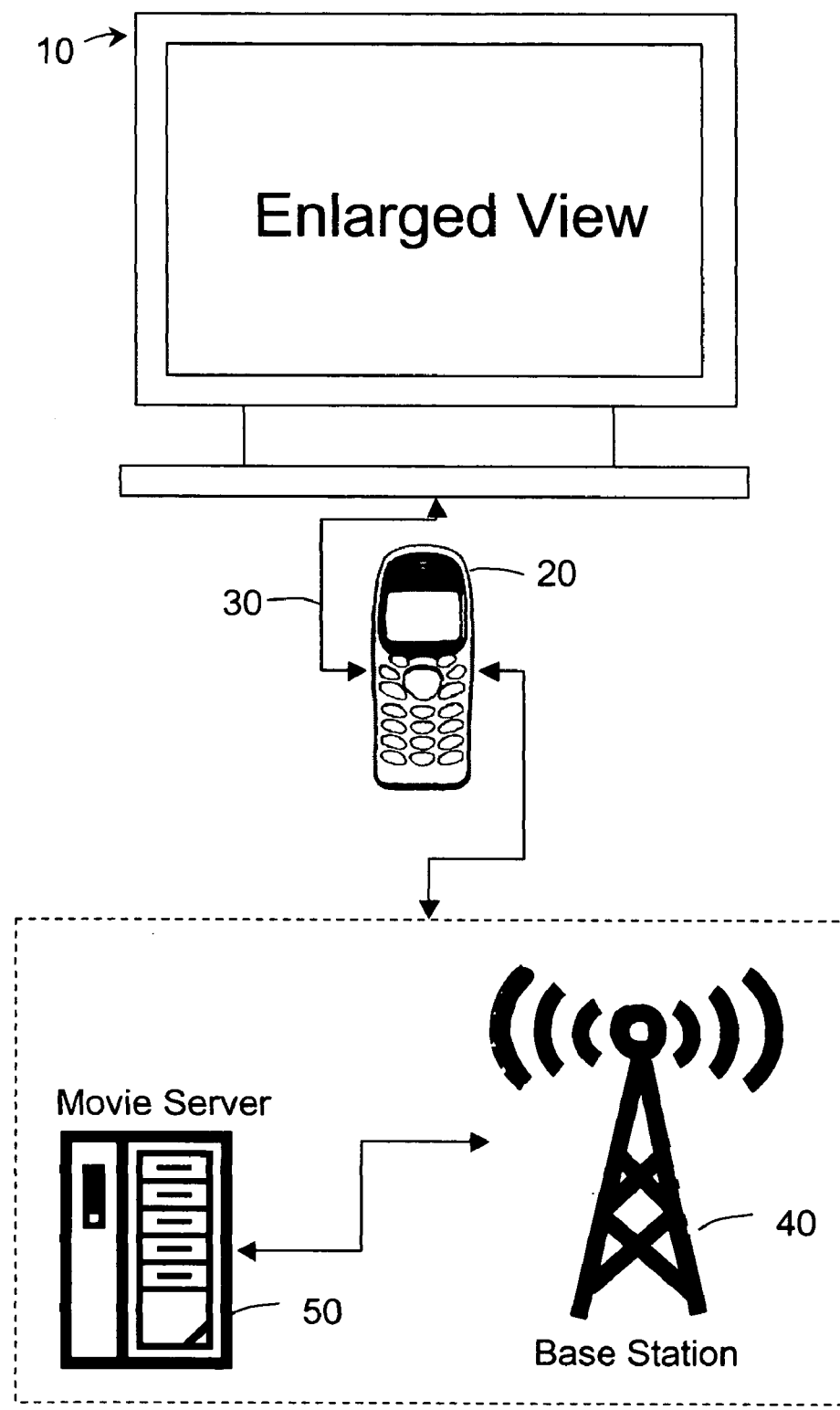
FIG. 1 shows an illustrative mobile device communicatively coupled to a display accessory and an audio video server via a base station according to one embodiment.

Referring to FIG. 1 there is shown an illustrative portable wireless system comprising a display accessory 10 communicatively coupled with a mobile device 20, which is configured to communicate with a base station 40 and an illustrative movie server 50. The mobile device 20 is configured to receive and store compressed audio video content from the illustrative movie server 50. The mobile device 20 is further configured to interface with the display accessory 10 through a connection medium 30. By way of example and not of limitation, the connection medium is a wired communication link. Alternatively, the connection medium 30 is a wireless communication link that provides the interface between the mobile device 20 and the display accessory 10. The display accessory 10 is configured to access audio video content stored on the mobile device 20 through the connection medium 10 and provides graphical and auditory representations.

Figure 2:
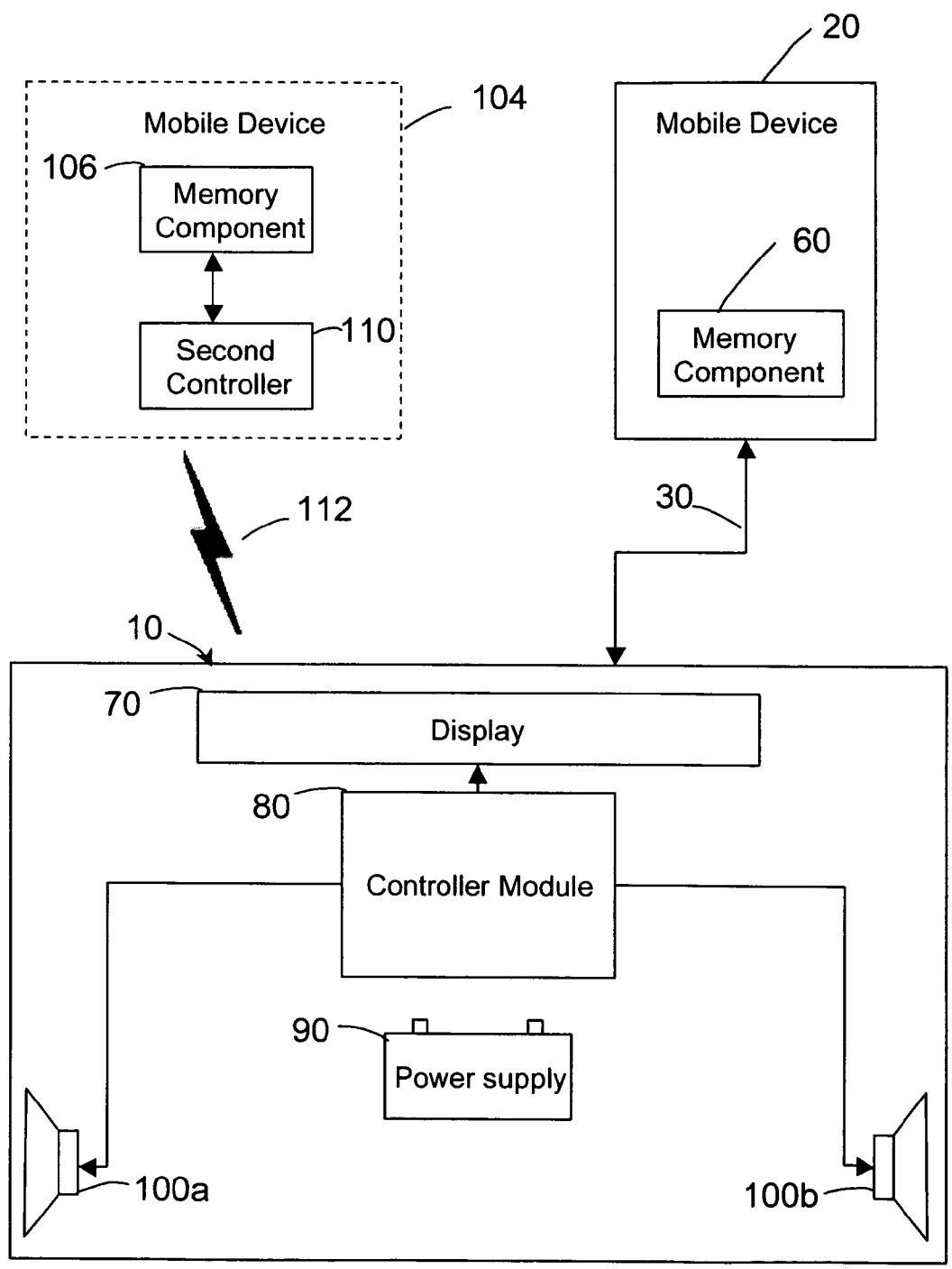
FIG. 2 shows a detailed view of a mobile device coupled to a display accessory according to one embodiment.

Referring to FIG. 2 there is shown a detailed view of the mobile device that is coupled to the display accessory 10. In a first embodiment, the mobile device 20 has a memory component 60 configured to receive and store compressed audio video content. The display accessory 10 comprises a display 70, a controller module 80, a local power supply 90, and two illustrative auditory output devices 100a and 100b.

The controller module 80 in the display accessory 10 is configured to communicate with the mobile device 20 and receive stored audio video content through the connection medium 30. The controller module 80 then reads the received content and generates rendered video signals and processed audio signals to the display 70 and the auditory output device (s) 100a and 100b, respectively.

The local power supply 90 is a rechargeable energy source that supplies energy to the display accessory 90 and all components therein. Additionally the local power supply 90 may supply power to the mobile device 20 through the connection medium 30.

The display 70 depicts video signals received from the controller module 80 and enables convenient viewing of video content stored on the mobile device 20. Correspondingly, the auditory output device processes audio signals from the controller module 80. The auditory output device 100 comprises a speaker, a headphone jack, any device that emits any combination of a variety of frequencies varying from around 20 Hz to around 20 kHz (hereinafter referred to as "audible frequency range"), or any combination thereof.

Alternatively, another mobile device 104 may comprise another memory component 106, and a second controller 110 that is complimentary to the controller module 80. This second controller 110 may be configured to relieve the burden of rendering and processing video and audio data. This second controller 110 may be used in the same manner as the controller module 80 in the display accessory 10. Thus, the second controller 110 may be configured to process and render audio and video content. Additionally, the second controller 110 shares the computational burden with the controller module 80.

An exemplary implementation of this alternative configuration comprises having the second controller 110 processing the audio content and sending it through the connection medium 112 to the display accessory 10. Concurrently, the controller module 80 is rendering video content and is generating video signals for the display 70. Additionally, the controller module 80 is receiving audio from the second controller 110 and is synchronizing the audio feed with the video shown on display 70.

Figure 3:
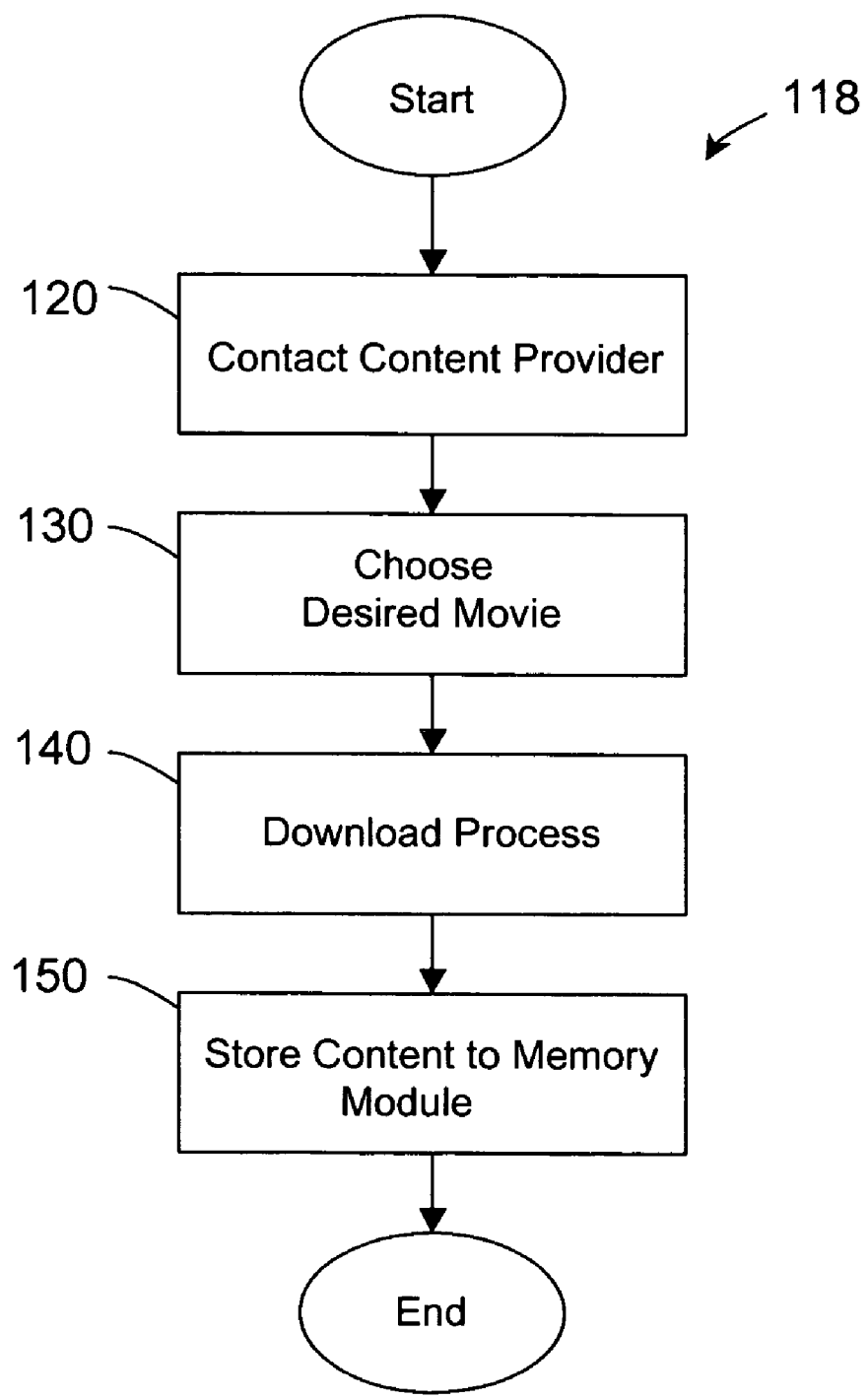
FIG. 3 shows an illustrative flowchart of a method for downloading and storing audio video content to a mobile device according to one embodiment.

Referring to FIG. 3, FIG. 2 and FIG. 1, there is shown an illustrative flowchart 118 of a method for downloading and storing audio video content to the mobile device. The illustrative mobile device 20 acquires audio video content from the server 50 through a wireless network. An exemplary functional process of this acquisition comprises, firstly, contacting the content provider as shown in block 120. The audio video content that is made available by the content provider includes, but is not limited to, music, music videos, short movies, silent movies, extended movies, televisions shows, and other such audio video content. The user then proceeds to select the desired content, e.g. a 90 minute movie, as described in block 130. At block 140, the user initiates the downloading of the audio video content. The downloading process 140 is designed to be tolerant of disconnection and latency of the wireless network, and is described in further detail below. When the download is complete, the content is stored on the memory module 60 and/or 106 as shown in block 150.

Figure 4:
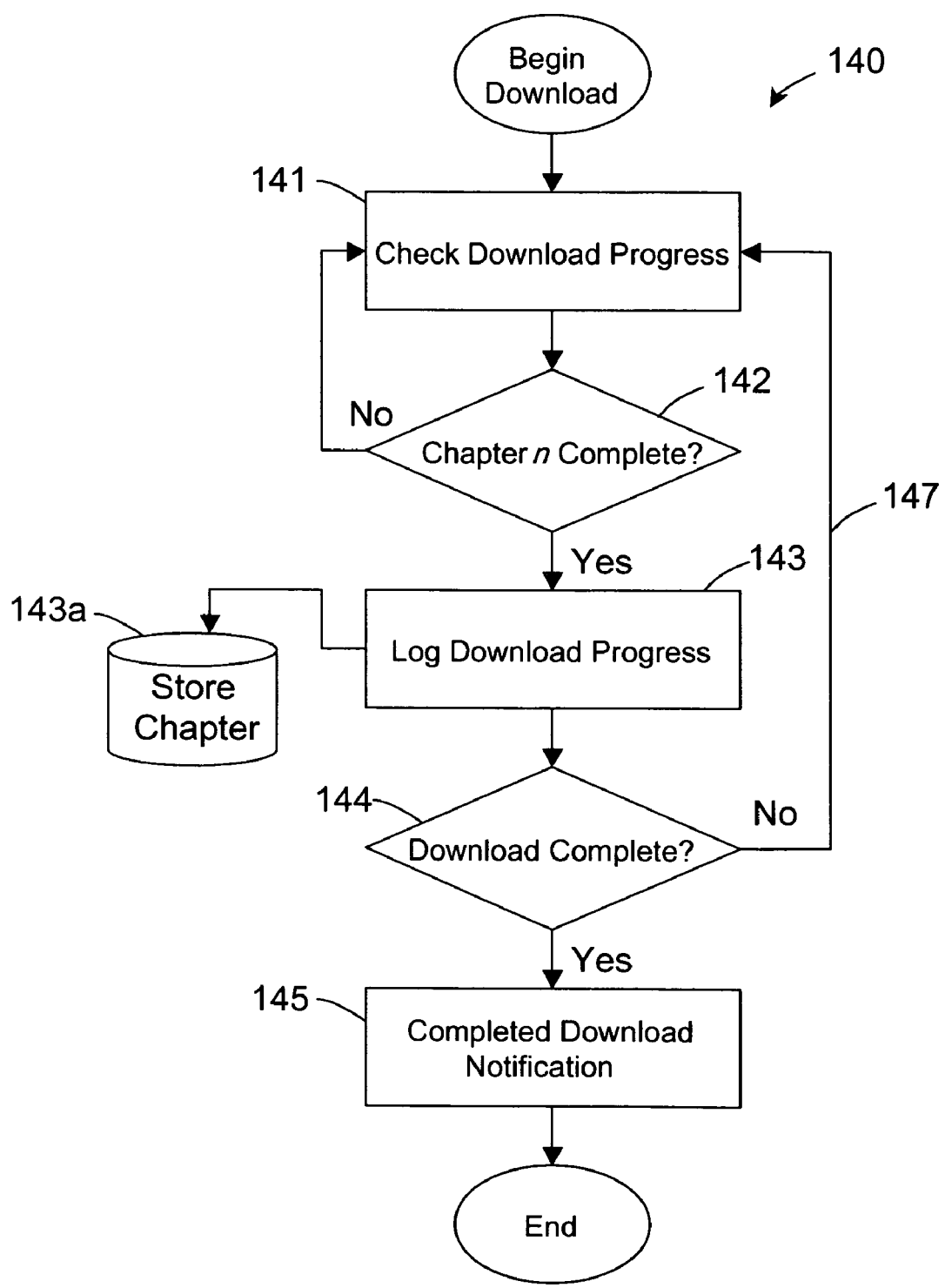
FIG. 4 shows an illustrative flowchart of a method for downloading audio video content to a mobile device from the audio video server according to one embodiment.

Referring to FIG. 4 and FIG. 1, there is shown an illustrative flowchart of a method for downloading audio video content to the illustrative mobile device 20 from the content server 50. The download process 140 referenced in FIG. 3 comprises a multi-stage process of download. This process is designed to alleviate known issues of downloading of large amounts of content to a mobile device 20, such as disconnects and bandwidth constraints. The download process 140 comprises acquiring audio video content packaged in multi-sectional data packages that are downloaded sequentially to the mobile device 20. The download process 140 firstly performs a checking of download progress 141, a verifying of chapter completion 142, a logging of download progress 143, a verifying of download completion 144, and, lastly, generating a download completion notification 145.

Checking the download progress 141 is significant to the download process 140 because it checks which chapters of the desired movie 130 have been downloaded. An exemplary functionality of the multi-sectional data packaging design allows for, inter alia, movies to be downloaded in pieces, e.g. the movie may be downloaded one chapter at a time.

When a user is mid-download and loses a connection to the wireless network, this may cause the download to have to be resumed or restarted at a later time, and offset the queue, thus corrupting the download. Simply verifying chapter download status 143 remedies this situation. The Chapter n Complete 143 logic section of the download process 140 does verifies the download progress of the chapter verified to be currently downloading by checking the download progress 141. If the chapter download is not complete, the download process will repeat the above progress check 141. Contrastingly, if the chapter download is complete, the download process 140 logs download progress 143. The logging of download progress 143 simply logs which chapter numbers, downloaded in multi-sectional data packages, have been completed in contrast with the checksum of the movie package. In addition to logging the progress of the download 143, the completed chapter of the audio video content selection is stored 143a in the illustrative memory module 60 of the illustrative mobile device 20.

The next step in the download process 140 is determining the overall status of download. This is achieved by analyzing the data logged in the prior step 143 and concluding that the download is completed, as shown in decision diamond 144. An exemplary embodiment of this step comprises analyzing the checksum of chapters and size of data so that size of data matches the amount of content downloaded. If the illustrative movie download is found to be incomplete, the download process 140 will enter a loop 147 that begins by checking the download progress 141 as described above. If the checksum and chapter list is found to be complete at decision diamond 144, the download process 140 will proceed to provide the user with a completed download notification 145.

Figure 5:
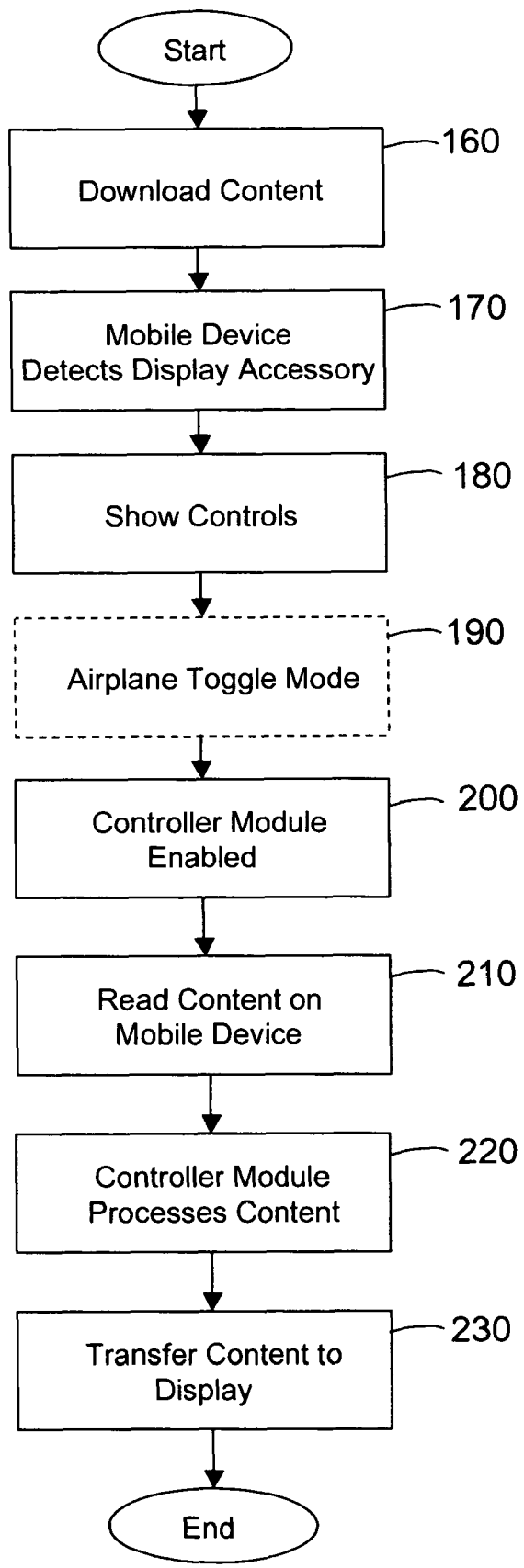
FIG. 5 shows an illustrative flowchart for a method for acquiring audio video content and accessing the audio video content stored on the mobile device from the display accessory according to one embodiment.

Referring to FIG. 5 and FIG. 1, there is shown an illustrative flowchart of a method for acquiring audio video content and accessing the audio video content stored on the mobile device 20 from the display accessory 10. The method for accessing the stored audio video content comprises, firstly, downloading content as described in block 160. The method then proceeds to have the illustrative mobile device 20 detect the display accessory at block 170. The mobile device 20 is detected through the use of connection medium 30 described above.

At block 180, controls for the mobile device 20 are shown to the user. The detection of the display accessory 10 by the mobile device at block 170 enables the mobile device 20 to initiate an illustrative viewing mode, in which the mobile device 20 provides the functionality of a remote control by displaying controls on a the display 70 (shown in FIG. 2). Alternatively, the display 70 may be a touch screen display that can provide controls for the viewing of the audio video content.

In one illustrative embodiment the method then proceeds to block 190 where the mobile device is configured to optionally disable Radio Frequency (RF) emitters in an airplane environment (hereinafter referred to as enabling "Airplane Mode"). Alternatively, a toggling method for enabling and disabling RF emitters compliment the controls described at block 180. The Airplane Mode allows for disabling RF emitters in locations where RF emissions are prohibited. The exemplary toggling method enables switching between Airplane Mode and the default mode to enable the traversal of the aforementioned prohibited and non-prohibited locations.

The method then proceeds to block 200, where the illustrative controller module 80 (described above in FIG. 2) is enabled. The illustrative controller module 80 then proceeds to read audio video content at block 210. At block 220, the transferred audio video content is received by the illustrative controller module 80 and processed by controller module 80 for display of video signals and audio signals. At block 230, the controller module 80 transfers the audio content and the video content to the display 70.

Figure 6:
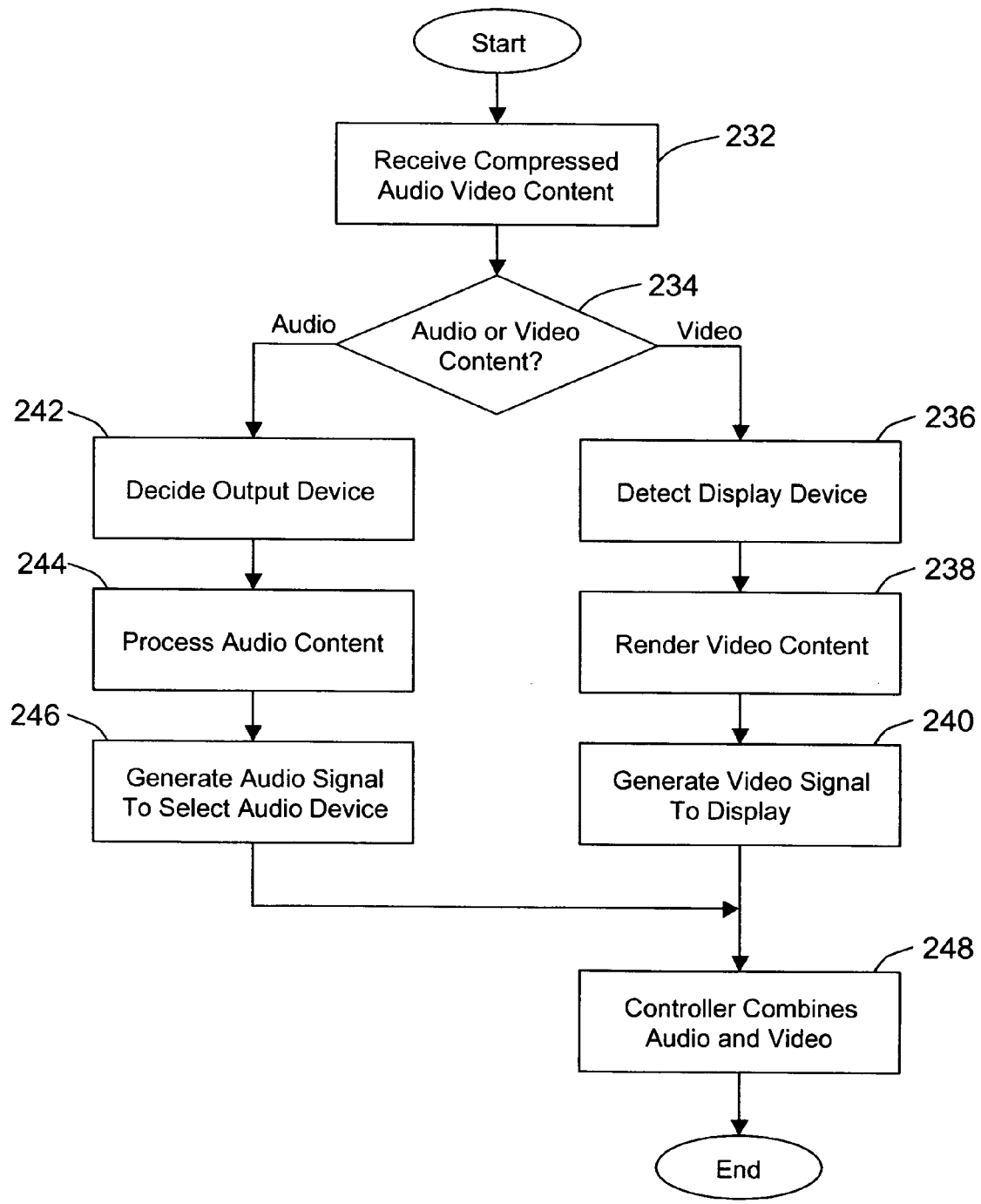
FIG. 6 shows an illustrative flowchart of a method for processing audio video content on a display accessory having a first controller module and on a mobile device having a second controller according to one embodiment.

Referring to FIG. 6 and FIG. 2, there is shown an alternative flowchart for processing audio video content stored on the mobile device that is communicatively coupled to the display accessory. In summary, the method for processing the transferred audio video content comprises receiving the content at block 232, determining if the content is audio content or video content at decision diamond 234, and separately processing the audio content and video content.

If the content is video content, the processing of the video comprises detecting the display at block 236, rendering the video at block 238, and generating a video signal 240 for the illustrative display 70. Thus the method provides for the detection of the display device, generation of video signals, and proper rendering that corresponds to the display 70 device.

If the content is audio content, the processing of the audio comprises detecting the output audio device at block 242, processing the audio content at block 244, and generating an audio signal for the corresponding auditory output device at block 246. The processed audio content is signal is converted into at least one frequency within the audible frequency range.

According to this alternative embodiment, the processing of the audio video content may include the second controller 110 and the controller module 80 sharing the computational load (as described above in FIG. 2). For example, this configuration may comprise the second controller 110 processing the audio content, at block 244, and sending audio signals through the connection medium to the display accessory 70. Meanwhile, the controller module 80 renders video content (as described in block 238), generates video signals (as described in block 240), and receives audio signals that are communicated to the display 70 and auditory output device(s) 100a and 100b. At block 248, the controller module 80 combines the audio signals and the video signals.

Referring back to FIG. 1, the illustrative systems and methods herein are utilized by wirelessly connecting the mobile device 20 to the base station 40, downloading audio video content, and storing the content in the memory component 60 on the mobile device 20. Additionally, the display accessory 10, communicatively coupled with the mobile device 20 through the connection medium 30 provides improved access to the stored content. Furthermore, the connective process of the connection medium 30 between the mobile device 20 and the display accessory 10 automatically provides the virtual remote, indicated by the controls 180 provided on the integrated display of the mobile device 20. The user may control the playback of audio video content by simply navigating their control set 180 on the mobile device 20.

It is to be understood that the foregoing is a detailed description of illustrative embodiments. The scope of the claims is not limited to these specific embodiments. Various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A portable wireless system, comprising:
   a first mobile device configured to communicate with a base station, said first mobile device having a first memory component configured to receive and store a plurality of compressed audio video content
   a second mobile device comprising a second memory component and a controller; and
   a display accessory in communication with said first mobile device and said second mobile device, comprising,
      a controller module configured to operatively communicate with said first mobile device and said second mobile device and receive and process the plurality of stored audio video content through a connection medium,
      a local power supply configured to supply energy to display accessory components at minimal capacity of said local power supply,
      a display configured to depict video signals received from the controller module and receive sufficient current from the local power supply,
      at least one auditory output device configured to process a plurality of audio signals from the controller module and receive sufficient current from the local power supply, and
      at least one input device configured to interface with a plurality of wireless devices, such as said first mobile device and said second mobile device;
   wherein the controller of the second mobile device shares the computational burden with the controller module of the display accessory.

2. The portable wireless system of claim 1, wherein said plurality of audio video content further comprises a plurality of multi-sectional data packages configured to be downloaded sequentially to the mobile device and reassembled therein.

3. The portable wireless system of claim 2, wherein the connection medium further comprises a wireless communication link.

4. The portable wireless system of claim 2, wherein the connection medium further comprises a wired communication link.

5. The portable wireless system of claim 2, wherein said local power supply is a rechargeable power supply.

6. The portable wireless system of claim 5, wherein said local power supply is further configured to recharge the first mobile device through the connection medium while communicatively coupled.

7. A display accessory in communication with a first mobile device and a second mobile device, comprising,
- a controller module configured to operatively communicate with said first mobile device and said second mobile device and receive and process a plurality of compressed stored audio video content through a connection medium,
- a local power supply configured to supply energy to display accessory components at minimal capacity of said local power supply, said power supply configured to be rechargeable,
- a display configured to depict video signals received from the controller module and receive sufficient current from the local power supply,
- at least one auditory output device configured to process a plurality of audio signals from the controller module and receive sufficient current from the local power supply, and
- at least one input device configured to interface with a plurality of wireless devices, such as said first mobile device and said second mobile device;
- wherein a controller of the second mobile device shares the computational burden with the controller module of the display accessory.

8. The display accessory of claim 7, wherein said local power supply is further configured to recharge the first mobile device through the connection medium while communicatively coupled.

9. The method of claim 7, wherein processing said compressed audio video content on said display accessory further comprises receiving said plurality of compressed audio video content to the controller module, said controller module configured to:
- generate a plurality of processed audio signals to at least one auditory output device; and
- generate a plurality of rendered video signals to a display.

10. A method for viewing content on a first mobile device with a display accessory comprising:
- acquiring a plurality of compressed audio video content through a wireless network;
- storing said plurality of compressed audio video content on said first mobile device having a memory component;
- interfacing said first mobile device to said display accessory through a connection medium;
- accessing the plurality of compressed audio video content on the first mobile device through said connection medium;
- transferring said plurality of compressed audio video content through the connection medium from said first mobile device to said display accessory;
- enabling a controller to read said plurality of compressed audio video content stored on said first mobile device, said controller module further configured to generate a plurality of rendered video signals and a plurality of processed audio signals, and processing said plurality of compressed audio video content in the controller module; wherein processing said plurality of compressed audio video content comprises processing said plurality of compressed audio video content in a second mobile device, said second mobile device further comprising a controller, the computational burden shared between the controller module of the display accessory and the controller of the second mobile device.

11. The method of claim 10 wherein said acquiring said plurality of compressed audio video content further comprises accessing a data store and downloading said plurality of compressed audio video content.

12. The method of claim 11, wherein said plurality of compressed audio video content comprises a plurality of multi-sectional data packages configured to be downloaded sequentially to the first mobile device and reassembled therein.

13. The method of claim 12, wherein said connection medium further comprises a wired communication link.

14. The method of claim 12, wherein said connection medium further comprises a wireless communication link.

15. The method of claim 12, wherein processing said compressed audio video content on said display accessory further comprises receiving said plurality of compressed audio video content to the controller module, said controller module configured to:
- generate a plurality of processed audio signals to at least one auditory output device; and
- generate a plurality of rendered video signals to a display.

16. The method of claim 15 wherein said at least one auditory output device is configured to receive and convert said processed audio signals to a correspondent form related to a select auditory output device.

17. The method of claim 16 wherein said display is further configured to receive and convert said rendered video signals to a correspondent form related to the display.

* * * * *